US012803488B2

(12) United States Patent
Sofaly et al.

(10) Patent No.: US 12,803,488 B2
(45) Date of Patent: Nov. 17, 2026

(54) HYSTERESIS-BASED ACTUATION OF A VEHICLE DRIVE WITH AN ALTERNATING FREEWHEELING AND SHORT-CIRCUIT STATE IN THE EVENT OF A FAULT

(71) Applicant: Vitesco Technologies GmbH, Regensburg (DE)

(72) Inventors: Bernhard Sofaly, Nuremberg (DE); Oliver Kastner, Donaustauf (DE); Janos Radeczky, Wenzenbach (DE); Thomas Voigt, Nuremberg (DE); Michael Rötzer, Berlin (DE)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 76 days.

(21) Appl. No.: 18/850,156

(22) PCT Filed: Mar. 20, 2023

(86) PCT No.: PCT/EP2023/057042
§ 371 (c)(1),
(2) Date: Sep. 24, 2024

(87) PCT Pub. No.: WO2023/180244
PCT Pub. Date: Sep. 28, 2023

(65) Prior Publication Data

US 2025/0219565 A1 Jul. 3, 2025

(30) Foreign Application Priority Data

Mar. 25, 2022 (DE) ..................... 10 2022 202 956.9

(51) Int. Cl.
*H02P 29/028* (2016.01)
*B60L 3/06* (2006.01)

(52) U.S. Cl.
CPC .............. *H02P 29/028* (2013.01); *B60L 3/06* (2013.01)

(58) Field of Classification Search
CPC ........ H02P 29/028; H02P 3/22; H02P 29/027; H02P 29/0241; B60L 3/06;
(Continued)

(56) References Cited

U.S. PATENT DOCUMENTS 9,154,051 B2 10/2015 Raichle et al.
9,496,810 B2 11/2016 Raichle et al.
(Continued)

FOREIGN PATENT DOCUMENTS

CN 106458040 A 2/2017
DE 10 2012 002 023 A1 12/2012
(Continued)

OTHER PUBLICATIONS

International Search Report (PCT/ISA/210) with translation and Written Opinion with machine translation (PCT/ISA/237) mailed on Jun. 23, 2023, by the European Patent Office as the International Searching Authority for International Application No. PCT/EP2023/057042. (29 pages).
(Continued)

*Primary Examiner* — Sze-Hon Kong
(74) *Attorney, Agent, or Firm* — Buchanan Ingersoll & Rooney PC

(57) ABSTRACT

A method for actuating a vehicle drive. If a fault occurs in the electric drive or in a component connected thereto, the inverter generates an AKS state in the form of an active short circuit of phase connections of the electric machine, or a freewheeling state of the electric machine. Once the fault has occurred, steps AKS and F are executed alternately. Step AKS: setting the AKS state if a phase current flowing through the phase connections is below a first current limit
(Continued)

and changing over to step F if the phase current reaches the first current limit; Step F: setting the freewheeling state if a DC voltage generated by the electric machine is below a first voltage limit and changing over to step AKS if the DC voltage is above the first voltage limit. A changeover from step AKS to step F if the phase current reaches a second current limit below the first current limit. A changeover from step F to step AKS if the DC voltage reaches a second voltage limit below the first voltage limit. A vehicle drive and a corresponding control program are used to execute the method.

11 Claims, 2 Drawing Sheets

(58) Field of Classification Search

CPC ........... B60L 2220/12; B60L 2240/421; B60L 15/007; B60L 58/13; B60L 2240/527; B60L 2240/529; B60L 2240/547; B60L 2260/26; B60L 3/0092; B60L 3/04; B60L 3/0023; H02M 1/32; H02M 7/758; B60Y 2200/91; Y02T 10/64

See application file for complete search history.

(56) References Cited

U.S. PATENT DOCUMENTS

| | | | | |
|---|---|---|---|---|
| 9,673,744 | B2 | 6/2017 | Eberlein et al. | |
| 11,362,651 | B1 * | 6/2022 | Krug | H03K 17/0822 |
| 2007/0069668 | A1 * | 3/2007 | MacKay | H02P 6/182 318/400.34 |
| 2016/0322927 | A1 | 11/2016 | Merkel et al. | |
| 2017/0305274 | A1 * | 10/2017 | Saha | H02H 7/1227 |
| 2017/0331400 | A1 * | 11/2017 | Saha | H02P 29/00 |
| 2017/0353140 | A1 * | 12/2017 | Baburajan | H02M 1/32 |
| 2019/0341871 | A1 * | 11/2019 | Nishibata | H02M 1/08 |
| 2020/0067443 | A1 | 2/2020 | Watanabe et al. | |
| 2022/0285927 | A1 * | 9/2022 | Bacigalupo | H02H 1/0007 |
| 2023/0246570 | A1 * | 8/2023 | Eberlein | H02P 3/18 323/268 |
| 2024/0274385 | A1 * | 8/2024 | Schmitz | H01H 47/32 |
| 2024/0348189 | A1 * | 10/2024 | Sprenger | H02M 7/5387 |

FOREIGN PATENT DOCUMENTS

| | | | |
|---|---|---|---|
| DE | 102012101508 | A1 | 8/2013 |
| DE | 102013213046 | A1 | 12/2014 |
| DE | 102016210238 | A1 | 12/2017 |
| EP | 2893604 | A1 | 7/2015 |

OTHER PUBLICATIONS

Search Report dated Nov. 25, 2022, by the German Patent Office for Application No. 10 2022 202 956.9, with machine translation. (10 pages).

Office Action (Notice to Submit Response) issued Jun. 30, 2026, by the Korean Ministry Intellectual Property Office in corresponding Korean Patent Application No. 10-2024-7035370 and an English translation of the Office Action. (12 pages).

* cited by examiner

HYSTERESIS-BASED ACTUATION OF A VEHICLE DRIVE WITH AN ALTERNATING FREEWHEELING AND SHORT-CIRCUIT STATE IN THE EVENT OF A FAULT

CROSS REFERENCE TO RELATED APPLICATIONS

This application is the U.S. National Phase Application of PCT International Application No. PCT/EP2023/057042, filed Mar. 20, 2023, which claims priority to German Patent Application No. 10 2022 202 956.9, filed Mar. 25, 2022, the contents of such applications being incorporated by reference herein.

BACKGROUND OF THE INVENTION

It is known to equip vehicles with an electric drive which has a permanently excited electric machine the phase connections of which are connected to an inverter. If a fault occurs while driving, electrical power is generated in generator mode of the electric machine while the vehicle is coasting. If the phase connections of the electric machine are open, i.e. not short-circuited by switches of the inverter, a high voltage may occur which may destroy electrical components, for instance components of the inverter or components which are connected to the DC side of the inverter (intermediate-circuit components). If the electric machine is operated in an active short circuit, that is to say in a state in which the phase connections are connected to one another in a targeted manner (for instance by switches of the inverter), a current may arise in generator mode while the vehicle is coasting, which current may likewise be damaging for electrical components of the drive, in particular for the switches of the inverter, which cause the short circuit.

SUMMARY OF THE INVENTION

Based on this, one aspect is to present a possibility which allows an electric machine to operate safely in the event of a fault.

This aspect is achieved by the subjects of the independent claims. Further properties, features, embodiments and advantages will become apparent from the dependent claims, the description and the figures.

What is proposed, in accordance with a hysteresis response with regard to a phase current generated by the generator mode of the electric machine, and in accordance with a hysteresis response with regard to a DC voltage generated by the generator mode of the electric machine, is to alternately execute a freewheel and an active short circuit (in accordance with the hysteresis limits in question being exceeded). Alternating between the states (freewheel or active short circuit, AKS) makes it possible to avoid a sustained overcurrent or a sustained excessive voltage when the vehicle is coasting in generator mode. The changeover between the states results here by way of a current upper limit (first current upper limit) which occurs in the AKS state, whereupon the freewheeling state is transitioned into. In order to prevent a sustained excessive voltage from occurring in the freewheeling state, the AKS state is reset to again conditional on a voltage upper limit (first voltage limit) being reached. Only when a critical variable in the state in question is reached (in the AKS state an excessive current in the form of the first current limit and in the freewheeling state an excessive voltage in the form of the first voltage limit) is a changeover made into the respective other state so that both limits are not exceeded. The limits which define the hysteresis (i.e. the first limits and/or the second limits) can be adjusted to suit the properties of the electric machine or of the inverter, in particular by cost-effectively adjusting parameters in a control device such as a microprocessor.

This makes it possible to limit in particular the current increase in addition to the voltage increase. An unlimited current would lead to excessive magnetic fields which, when a permanently excited electric machine is used, would lead to a sustained (at least partial) demagnetization of the permanent magnets of the electric machine. The first current limit is therefore also used to protect the permanent magnets against sustained damage. The first current limit is in particular lower than current values which would lead to partial (or complete) demagnetization of the permanent magnets.

Overall, it is possible to react in a more careful way to a fault state of the vehicle drive or of a component connected thereto, wherein the power generated in generator mode does not lead to a sustained overcurrent (which can lead to the damaging of permanent magnets) or to a sustained overvoltage which (in particular on the basis of the sustained occurrence and the level in question) is capable of causing long-lasting damage to components such as an intermediate-circuit capacitor or switches of an inverter. In particular, if the vehicle is still traveling at a high driving speed, the method described here can be used to reduce the kinetic energy of the vehicle without persistently endangering a component due to an overcurrent or due to an overvoltage. In addition, the procedure described here is also possible if the speed is too high for a sustained freewheeling state or a sustained AKS state to be applied without endangering or destroying electrical components. This also makes it possible to react in a safe manner to a fault state which occurs in the vehicle drive or in a component connected thereto, for instance in a traction accumulator which is connected to the vehicle drive for power transmission purposes. The DC voltage generated by the generator mode of the electric machine corresponds in particular to an intermediate-circuit voltage or to a DC voltage on the DC side of the inverter.

The inverter also has an AC side which is connected to the electric machine or to the phase connections thereof. The inverter is in particular configured to transmit power from the DC side to the AC side. The inverter is in particular equipped with switches which in the open state also conduct current from the AC side to the DC side if a voltage on the AC side is greater than a voltage on the DC side, wherein in this case in particular inverse diodes of the switches allow for this current to be conducted. The result may be for instance in the freewheeling state a voltage on the AC side which is greater than that on the DC side such that in the freewheeling state this results in a current flow to the DC side at a voltage the level of which may be critical for the inverter or for components which are connected to the DC side. The hysteresis-related changeover according to an aspect of the invention in this case from the freewheeling state ("6SO") to the state of the active short circuit ("AKS", "3PS") prevents the inverter from (continually) receiving an excessive voltage on the DC side.

A method for actuating a vehicle drive is therefore described, wherein the vehicle drive has an electric machine and an inverter. The electric machine is a traction machine which in particular is permanently excited. The inverter is used to actuate the machine and is in particular connected to the phase connections of the electric machine. The inverter has in particular an AC side which is connected to these phase connections. The inverter can be used to set the two mentioned states (in addition to a driving state and optionally a controlled recuperation state for fault-free operation). If a fault occurs in the electric drive or generally in the vehicle, the inverter generates an AKS state in which an active short circuit of the phase connections of the electric machine is generated. Since the inverter is also connected to the phase connections of the electric machine for normal operation, it is thus also capable of actuating the active short circuit. This can in particular be provided by actuating an ON state of all the high-side transistors or all the low-side transistors while the respectively opposite transistors (low-side transistors and high-side transistors, respectively) are open.

If a fault occurs in the electric drive or in a component connected thereto, an accumulator is in particular disconnected from the inverter or an intermediate circuit, in particular from the DC side thereof. This prevents a power flow from the accumulator to the inverter or to the electric machine which is in the AKS state or in a freewheeling state (as illustrated below). If a fault occurs in the electric drive or in a component connected thereto, the accumulator is preferably first of all separated before an AKS state or a freewheeling state is set. The accumulator can be reconnected to the inverter or to the intermediate circuit when the fault state no longer exists and when neither the AKS nor freewheeling state exists. Provision can in particular be made for the accumulator to be able to be reconnected to the inverter or to the intermediate circuit when a reset signal which characterizes fault-free operation and that a check has been carried out on the drive is present.

The inverter is furthermore configured to generate a freewheeling state of the electric machine. This is carried out by switching the transistors of the inverter to an open state. The inverter is capable of setting the AKS state and the freewheeling state, but not at the same time. The inverter is thus configured to set, in the event of a fault, the AKS state or the freewheeling state. Naturally, both states cannot be set at the same time. If a fault occurs, both states are executed alternately in an intermediate phase. In particular, steps referred to as AKS and F are executed alternately, wherein these steps involve setting one of the two states and changing over to the respective other step or to the respective other state when a first limit in question is reached. The resulting first limits form in particular an upper limit for the hysteresis response in question.

In step AKS, which in particular constitutes the active short circuit and its changing over to the freewheel conditional on a first current limit being reached, the AKS state is set. This happens in particular at the beginning of this step. In particular, the AKS state is then set if a phase current flowing through the phase connections is below a first current limit. This first current limit may be a permanent load limit (optionally provided with a safety margin) beyond which at least one component of the vehicle drive is endangered due to the sustained excessive current. In particular due to inductances, the phase current at the beginning of step AKS is low and increases in accordance with the inductances (for instance of the electric machine). A changeover is made to step F (in particular to the freewheeling state) if the phase current reaches the first current limit.

In a step F, which in particular relates to the freewheeling state and the changing over to step AKS conditional on a first voltage limit being exceeded by the open-circuit voltage, first of all the freewheeling state is set. In particular, the freewheeling state is then set in step F if a DC voltage generated by the electric machine is below a first voltage limit. Furthermore, provision is made in step F for a changeover to be made to step AKS if the DC voltage is above the first voltage limit. The electric machine generates this DC voltage in particular on a DC side of the inverter which is connected to the electric machine. The DC voltage referred to is therefore also a voltage which results through rectifying a generator AC voltage generated on the phase connections of the electric machine. Since the generation of the DC voltage stems from the generator mode of the electric machine, this is referred to as DC voltage generated by the electric machine even if this involves rectifying an AC voltage (by way of the inverter) which occurs on phase connections of the electric machine. This can also be referred to as: “the DC voltage generated indirectly (for instance via rectification) by the electric machine”.

The changing over to step F ends the step AKS, and the changing over to step AKS within step F ends step F. Both limits mentioned are each upper limits of a hysteresis. The first current limit is a first transition condition of a hysteresis response while the first voltage limit is a further transition condition of the hysteresis response. While the first current limit being exceeded leads to the transition to the freewheeling state, the first voltage limit being exceeded leads to an active short circuit (=AKS state). The hysteresis response in this case involves in particular an hysteresis based on the phase current and an hysteresis based on the DC voltage. Since these hysteresis are linked to one another, the result is a hysteresis response with a first voltage limit and with a first current limit, which are each upper limits of the hysteresis response and come into effect depending on step (F or AKS). This also applies for the second limits explained below.

A further aspect is that when a further limit (in the form of a second current limit and a second voltage limit) is fallen below, the present state is likewise changed over. This makes it possible to effectively reduce the kinetic energy of the vehicle without damaging electrical components due to overload (current overload or voltage overload).

Overall, two hysteresis controls thus result, namely a current hysteresis and a voltage hysteresis. As mentioned, the hysteresis are linked to one another, and a hysteresis response results both for the phase current and for the DC voltage. The first current limit and the second current limit can form a part of the first hysteresis control (current hysteresis), wherein the first current limit forms the upper limit and the second current limit forms the lower limit of this first hysteresis or hysteresis control. The first hysteresis can be referred to as current hysteresis. If the upper limit, that is to say the first current limit, is reached, a changeover is made from the AKS state to the freewheeling state. If the second current limit is reached, a changeover is made from the AKS state to the freewheel. The second hysteresis control or hysteresis corresponds to a voltage hysteresis, wherein the upper limit of this hysteresis is formed by the first voltage limit, and the lower limit of the hysteresis is formed by the second voltage limit, which is lower than the first voltage limit. If the first voltage limit is reached, a changeover is made to the AKS state or to the step AKS. Conversely, if the second voltage limit is reached, a changeover is made from the freewheeling state to the step AKS or to the AKS state.

If the first current limit is exceeded or if the second current limit is fallen below, a changeover is thus made from the AKS state to the freewheeling state or from step AKS to step F. If the first voltage limit is exceeded and if the second voltage limit is fallen below, a changeover is made from the freewheeling state to step AKS or to the AKS state. This results in an automatically alternating response, wherein it is ensured that neither a current upper limit nor a voltage upper limit (first limits) is exceeded, and wherein furthermore in order to effectively reduce the kinetic energy a changeover takes place due to the respective second limit being fallen below. There is thus constant changing over within the intermediate phase. Furthermore, this results in the phase voltage being between the first and the second voltage limit (at least within the intermediate phase), and the current in the event of a short circuit likewise being between the first and second current limit. As a result, an overload due to the first limits being exceeded and too low a reduction in the kinetic energy due to the second limits being fallen below are avoided. Moreover, acceptable driving behavior results due to the resulting braking power held in certain limits in generator mode, and in particular no major changes in the braking acceleration result, that is to say no major jerking of the brakes, since for both states within the intermediate phase there is a range between the first and second limits which leads to the braking torque (averaged) also being in a certain range which corresponds to the limits.

That which has been mentioned above relates in particular to an intermediate phase, wherein, at speeds below a certain driving speed, other, optionally constant measures can also be taken.

Embodiments make provision for an AKS state or a freewheeling state to be set in a preliminary phase. Within the preliminary phase, no changeover is made to this state or at least not in dependence on one of the first and second voltage and current limits being exceeded or fallen below. In the preliminary phase, a changeover can be made between the AKS state and freewheeling state in particular in dependence on an operating parameter such as temperature or the like being exceeded or fallen below. Within the preliminary phase, a changeover can also be made in dependence on a current and/or voltage limit being exceeded or fallen below but not within the scope of one of the hysteresis controls specified here and preferably also only in dependence on a single limit but not in dependence on a second limit which relates to the same operating parameters (for instance current or voltage). The preliminary phase begins at or after the occurrence of the fault. The intermediate phase begins (directly or indirectly) after or at the end of the preliminary phase. The preliminary phase may be ended for example in dependence on a driving speed. Embodiments in which the intermediate phase begins at the occurrence of the fault have in particular no preliminary phase. Embodiments which have a preliminary phase also have an intermediate phase which is carried out after the preliminary phase. Such a preliminary phase can for example be carried out in the transition to the hysteresis-related control mentioned at the outset, for instance in order to prepare the control for the intermediate phase. The preliminary phase can therefore also be simpler in design than the intermediate phase in order to thus ensure that no high reaction times or complex calculations are required during the preliminary phase. In order to provide such a simplified preliminary phase, provision can be made for only an AKS state or a freewheeling state to be set, or for a changeover to be carried out only in accordance with a simple condition such as "a limit being exceeded or fallen below" without further conditions having to be met.

Further embodiments make provision for an AKS state or a freewheeling state to be set in a subsequent phase until the end of the subsequent phase. The subsequent phase takes place after the intermediate phase. In particular, the subsequent phase begins at the end of the intermediate phase. In the subsequent phase, either the AKS state or the freewheeling state is set, preferably without a changeover being made between the states during the subsequent phase. Further embodiments make provision for a changeover to be made possible between the two states in the subsequent phase but only in accordance with simple conditions such as "a certain limit being exceeded or fallen below" without further conditions having to be taken into account. This exceeding and falling below can relate to the phase current, the phase voltage, the rotational speed or the driving speed. The freewheeling state can in particular end when the vehicle is at a standstill. Further embodiments make provision for the subsequent phase to end when a certain speed (for instance 5 km/h or similar) has been reached. Embodiments make provision for a plurality of subsequent phases to follow one another. This can also be provided for the preliminary phase.

Furthermore, provision can be made for the intermediate phase to be ended if the first current limit is not reached in step AKS or in the AKS state. A subsequent phase may follow. In particular, the intermediate phase is ended if the first current limit is not reached within a predefined period of time in step AKS in order to thus avoid a situation where delayed reaching of the first current limit due to inductances already leads to the ending of the intermediate phase. If the first current limit is not reached in step AKS, in particular also not within a predefined period of time, it can be assumed therefrom that the speed of the vehicle is no longer enough to generate, in generator mode, a current (within the step AKS or in the AKS state in the intermediate phase) which can lead to a changeover being made to the freewheeling state. In this case, the intermediate phase is preferably ended. Since the hysteresis-related changing over between the AKS state and freewheeling state is thus no longer present, the intermediate phase is ended.

Alternatively and in combination with this, the intermediate phase can be ended if the first voltage limit is no longer reached in step F or in the freewheeling state. This is the case if the speed of the vehicle is no longer enough to achieve, in generator mode in the freewheeling state, an open-circuit voltage which would lead to a changeover being made from the open-circuit state to the AKS state when the first voltage limit is exceeded. Once the intermediate phase has ended, a subsequent phase, as described previously, can begin.

Further embodiments make provision for, if a fault occurs before the intermediate phase, an AKS state to be set in a preliminary phase if the rotational speed of the electric machine is below a rotational speed limit. If the rotational speed of the electric machine is above a rotational speed limit (or is equal to the latter), a freewheeling state is then set in the preliminary phase. The corresponding mechanism (AKS state or freewheeling state) can thus be set in the preliminary phase in a simple manner depending on the rotational speed limit. Since the speed of the vehicle corresponds to the rotational speed limit, the vehicle speed can also be used instead of the rotational speed limit. Furthermore, provision can generally be made for a rotational speed limit to be used instead of a vehicle speed as the limit (which when exceeded or fallen below leads to the end of the intermediate phase), or vice versa.

In particular, at the beginning of the preliminary phase it can be ascertained whether the rotational speed of the electric machine is above or below the rotational speed limit by measuring a rotational speed by means of a rotational speed sensor and comparing said rotational speed with the rotational speed limit. In the same way, at the beginning of the preliminary phase it can be ascertained whether a vehicle speed is above a vehicle speed limit by measuring the vehicle speed and comparing it with a vehicle speed limit. Since the vehicle speed can also be ascertained in a simple manner or is present in the vehicle, at the beginning of the preliminary phase the freewheeling state or the AKS state can therefore be set in a simple manner depending on the rotational speed of the electric machine or the vehicle speed. In the preliminary phase, the set state is preferably maintained unless the rotational speed exceeds or falls below the rotational speed limit in order to thus set the corresponding state. This also only requires simple calculations and can therefore be executed reliably.

In order to ascertain the rotational speed or the vehicle speed, as mentioned it is possible to use a signal which corresponds to the rotational speed or to the vehicle speed, in particular by using sensors. Alternatively, a phase voltage or the DC voltage or else the phase current can be used as a variable for this purpose. In this case, the level or the (ripple) frequency of the mentioned variables can be used. At the beginning of the preliminary phase, it can therefore be ascertained whether the rotational speed of the electric machine is above or below a rotational speed limit by setting a freewheeling state at the beginning of the preliminary phase. During this state, the phase voltage is measured and compared with a voltage threshold value. If the voltage threshold value is exceeded a rotational speed above the rotational speed limit is assumed. If the voltage threshold value is fallen below a rotational speed below the rotational speed limit is assumed. The same thing also applies for the vehicle speed and the speed limit in question. The term voltage threshold value is used in this case to define a simple comparator decision without hysteresis response. The same thing also applies for the term current threshold value used here. The terms voltage limit and current limit mentioned at the outset, that is to say the first and the second current limit and the first and the second voltage limit, are used to define a hysteresis response, wherein the first and second limits define the upper and lower limits, respectively, of the hysteresis response.

Provision can furthermore be made for it to be ascertained, at the beginning of the preliminary phase, whether the rotational speed of the electric machine is above or below the rotational speed limit by setting an AKS state at the beginning of the preliminary phase. A phase current flows during this phase, wherein the phase current is measured and is compared with a current threshold value. The latter is used to define a simple comparator behavior as follows. If the current threshold value is exceeded a rotational speed above the rotational speed limit is assumed. If the current threshold value is fallen below a rotational speed below the rotational speed limit is assumed. As a result, by measuring the phase current and by means of a simple comparator comparison, without hysteresis response, the rotational speed or the vehicle speed can be inferred in the preliminary phase in order to thus set the appropriate measure (AKS state or freewheeling state). Here too, no hysteresis response is used in the preliminary phase but rather a simple, hysteresis-free comparator system which is defined by the threshold value in question.

Furthermore, an electric vehicle drive which has an inverter and an electric machine is described. Said electric vehicle drive is configured to execute the method described here. The vehicle drive has a control apparatus for this purpose. The latter is connected to the inverter for actuation purposes. The control apparatus is configured to execute the method as claimed in one of the preceding claims. In particular, the control apparatus is intended, in accordance with the method described here, to set the AKS state and the freewheeling state (depending on the mentioned conditions) or to execute the step F and the step AKS. In addition, the control device is preferably designed to execute the method described here in the subsequent phase or to execute the method described here in the preliminary phase.

The electric vehicle drive is in particular a traction drive of the vehicle, wherein the electric machine is connected to the vehicle drive in a rotational-speed-transmitting manner. The electric machine in this case is a permanently excited machine, for instance a synchronous machine.

Moreover, a vehicle drive control program which is configured to carry out the method described here is described. In this case, the control program can be configured to run in a control apparatus which actuates the inverter. The control program comprises sections for executing the method steps described here, in particular for measuring the phase voltage and the phase current and for changing over between the different states or steps AKS and F.

BRIEF DESCRIPTION OF THE DRAWINGS

FIG. 2 is used to illustrate the effects of repeatedly changing over between the AKS state and freewheeling state, as also occurs in the procedure according to an aspect of the invention.

DETAILED DESCRIPTION OF EXEMPLARY EMBODIMENTS

Figure 1:
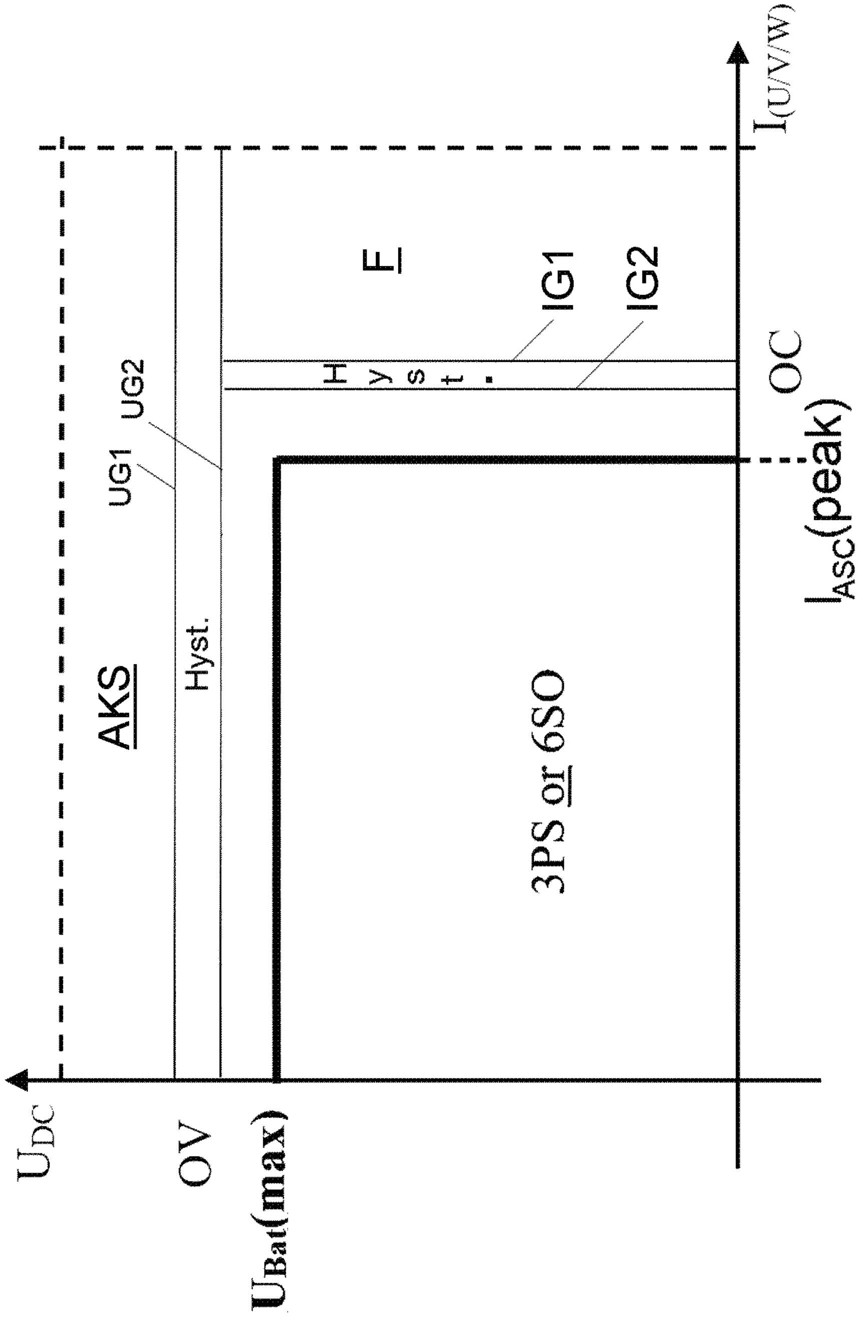
FIGS. 1 and 2 are used to further explain exemplary embodiments according to the procedure described here. In particular.

FIG. 1 shows a diagram for illustrating the limits (and threshold values) described here which in particular are used in the method. The phase current $I_{(U/V/W)}$ is plotted on the x-axis, while the DC voltage on the DC side of the inverter (i.e. the intermediate-circuit voltage) is represented on the y-axis, here illustrated by $U_{DC}$. If the DC voltage is below the voltage threshold value UBat(max), a freewheeling state can be set permanently, which state is denoted as 6SO here. If a freewheeling state, in which the DC voltage is below this voltage threshold value, is thus set, a freewheeling state can be set irrespective of the current limits and voltage limits and in particular continues (in contrast to the alternating AKS and freewheeling state according to the method). If the phase current $I_{(U/V/W)}$ is below the value $I_{ASC(peak)}$, an AKS state can be set, which state is denoted as 3PS here. This can also then be permanent, in particular irrespective of the voltage limits or current limits described here. If both first limits (current limit, voltage limit) are thus not reached, either an AKS state or a freewheeling state can be set.

For higher phase currents or DC voltages (greater than $U_{Bat(max)}$ and $I_{ASC(peak)}$, respectively), a changeover is made between the freewheeling state and the AKS state depending on voltage limits UG1, UG2 and current limits IG1, IG2. For this purpose, the first current limit IG1 and the second current limit IG2 (which together form a current limit range OC) are plotted in FIG. 1. Furthermore, a first voltage limit UG1 and a second voltage limit UG2, which form the voltage limit range OV, are plotted. Both the current limits IG1, IG2 and the voltage limits UG1, UG2 form (in each case) limits of a hysteresis and together form the limits of the common current-dependent and voltage-dependent hysteresis response.

If the limits of the illustrated hysteresis (Hyst.) are exceeded, this leads to a changeover being made from the AKS state to the freewheeling state, or vice versa. Since the voltage limits UG1, UG2 are relevant in the freewheeling state and the current limits IG2, IG1 are relevant in the AKS state for the switching over, the illustrated voltage and current hysteresis can be assigned to a common hysteresis response. In other words, in the AKS state only the current limits IG1, IG2 are relevant for the switching over or for the changing over between the steps AKS and F, and not the voltage limits UG1, UG2. In the same way, in the freewheeling state the current limits IG1, IG2 are not relevant but only the voltage limits UG1, UG2.

This thus results in a hysteresis range, which is denoted by Hyst. and which leads to the state being changed over when the first limits UG1, IG1 are exceeded, that is to say from the AKS state to the freewheeling state or vice versa, and to the state likewise being changed over when the second limits are fallen below, that is to say the limits UG2 and IG2, respectively.

It can further be seen from FIG. 1 that, at phase voltages above the first voltage limit UG1, an AKS state is set in order to thus avoid an excessive open-circuit voltage being permanently present at the inverter. The DC voltage in question may be a measured or in particular extrapolated voltage, that is to say an estimated voltage which would occur at the operating parameters in question if a freewheel were to be set.

In the same way, a freewheel F is set if a (likewise estimated) phase current which would be above the first current limit IG1 would occur. In this case, as illustrated, a freewheeling state F is set. Above these current and voltage limit ranges UV, OC, a state is thus permanently set, in particular a state which is independent of a hysteresis response, that is to say independent of the second limits.

Figure 2:
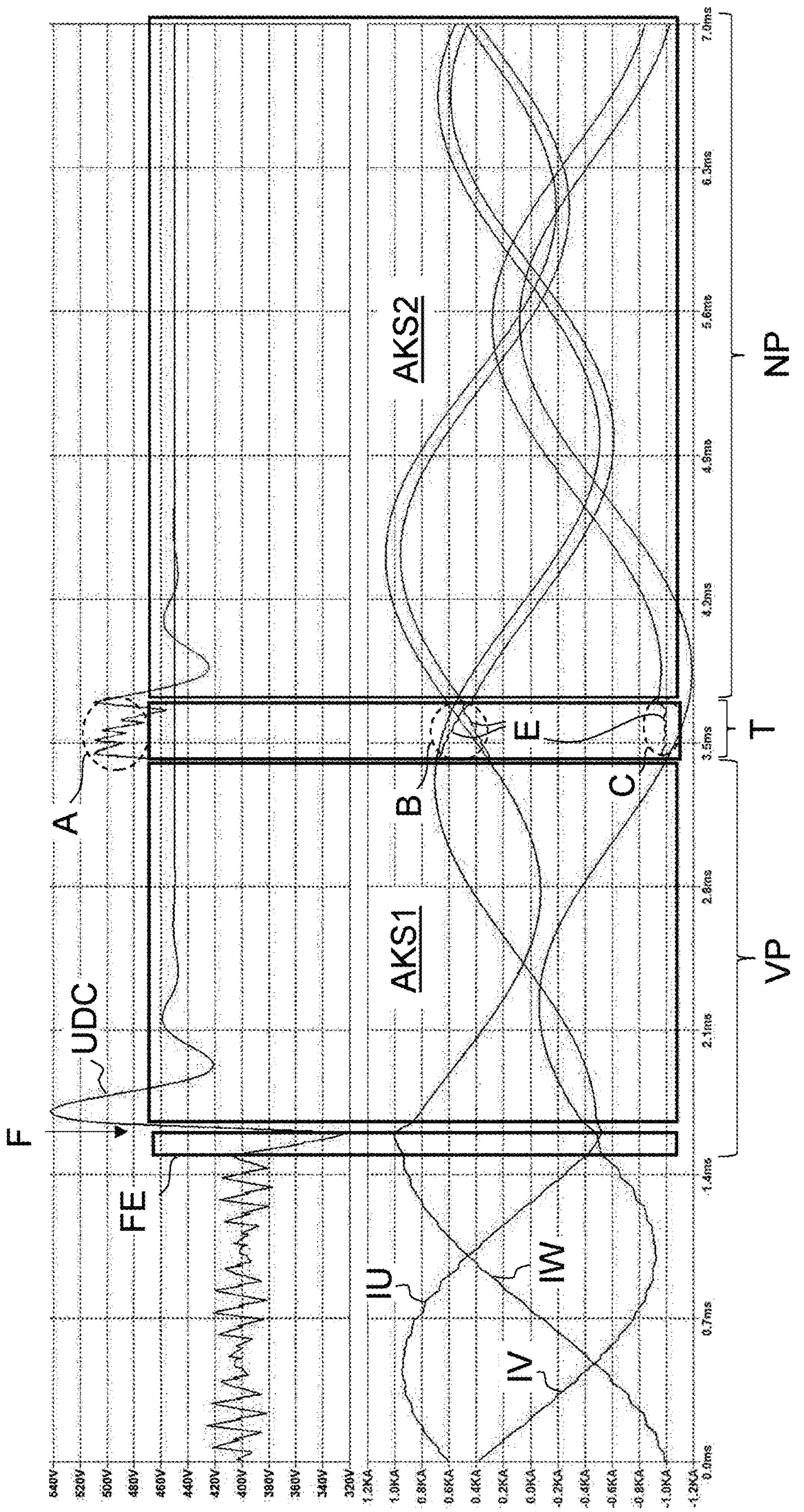

FIG. 2 illustrates exemplary current and voltage characteristics which illustrate the effect of repeatedly changing over between freewheel and AKS, as also occurs in the procedure according to an aspect of the invention.

In the upper half of the diagram, the characteristic of a phase voltage is illustrated, here by way of example in a range from 320 V to 540 V. In the lower half of the diagram, the characteristic of a phase current is illustrated in a range from −1200 A to 1200 A. The same time axis (x-axis) is provided for both illustrations, wherein a period of time of between 0 ms and 7 ms is shown here.

The DC voltage UDC illustrated in the upper half results from the voltage on the DC side of the inverter and in particular from the phase voltages (on the AC side of the inverter) by way of rectification (via the inverter). Generally, instead of the DC voltage, the RMS or peak value of one of the phase voltages (or of all of the phase voltages) can be used as a measure of the DC voltage. The voltage between two phase connections is referred to as the phase voltage.

The phase currents of the individual phases are referred to as IU, IV and IW. In the diagram, all three phase currents are illustrated but embodiments of the procedure illustrated here can also relate to only one of these phase currents, or an (arithmetic) sum of the phase currents, in particular a sum of the absolute values of the individual phase currents IU, IV and IW.

Between the times 0 ms and 1.5 ms, FIG. 2 illustrates the current and voltage characteristic during fault-free operation. In FIG. 2, which illustrates a simulation result, a fault is assumed at the time 1.5 ms ("frozen PWM", i.e. no clocking pulse width modulation). As a result, the voltage UDC drops in this range, cf. in particular the range FE in which a fault takes place. At the end of the range FE, a short phase in which a freewheel F takes place begins. Setting the freewheel F is the reaction to the fault which occurs at the time 1.5 ms. It can be seen that during this section of time which begins at the end of FE and ends at the start of AKS1, the voltage UDC rises considerably. The voltage UDC corresponds to the DC voltage generated by the electric machine (on the DC side of the inverter). It can further be seen that the currents IU, IV and IW between the phase FE and the phase AKS1, i.e. in the phase of the freewheel F, decrease or are attenuated with respect to their previous characteristic.

The increase in the DC voltage UDC or the attenuation of the currents IU to IW ends at the beginning of the phase AKS1 which illustrates an AKS state. The transient response illustrated in FIG. 2 of UDC at the beginning of AKS1 is explained by the inductances of the electric machine.

The AKS state AKS1 extends from about 1.6 m/s to 3.4 m/s. This is directly followed by an intermediate phase T in which the steps AKS and F are executed alternately. In the procedure according to an aspect of the invention, the changeover takes place in accordance with a hysteresis response with two current limits and two voltage limits. In order to simplify the illustrated simulation, FIG. 2 has been based on a periodic (i.e. time-dependent) changing over between AKS and F in the intermediate phase T. This illustrates the effect of repeatedly changing over between AKS and F, as would essentially also occur in the hysteresis-based procedure according to an aspect of the invention for changing over between AKS and F. Although the hysteresis-based alternation of AKS and F according to an aspect of the invention would not lead to exactly periodic changing over, the illustrated simulation does approximate repeatedly changing over between AKS and F precisely enough to roughly illustrate the effects of the intermediate phase according to an aspect of the invention on current and voltage.

It can be seen that in the intermediate phase T, by virtue of the repeated changing over, the magnetization of the inductances is reduced little by little and that the voltage UDC increases with an increasingly flatter gradient after each changeover to a freewheel. It can therefore be seen that by virtue of the intermediate phase or the changing over between AKS and F, magnetization energy can be reduced in a controlled way and the voltage increase flattens little by little during the changeover to a freewheeling state. Similarly, it can be seen that the currents and also the current surges are likewise limited. This controlled reduction therefore allows the occurrence of a fault in a permanently excited synchronous machine to be handled in a controlled way.

In contrast to FIG. 1 which is based on a periodic changing over between AKS and F, in a hysteresis-based switching over in the intermediate phase T, the individual spikes in the voltage UDC would be of the same level since an upper voltage limit would define the changeover from F to AKS and would thus define the upper limit for the voltage spikes (cf. section A).

The voltage spikes in the voltage UDC result exactly at the beginning of the phase AKS2 due to the fact that in the illustrated simulation at the end of the intermediate phase T a freewheeling state has been established for a period of time longer than the duration between a changeover between AKS and F in the intermediate phase T.

The intermediate phase T is followed by a second phase in which an AKS state exists (the first phase in which an AKS state exists is denoted by AKS1). It can be seen that the DC voltage UDC there behaves essentially constantly after a transient process and that decreasing currents IU to IW result over the course of time.

Furthermore, FIG. 2 illustrates that there may be a preliminary phase VP (corresponding to the phase AKS1) before the intermediate phase T and that there may be a subsequent phase NP (corresponding to the phase AKS2) after the intermediate phase T. In the preliminary phase VP, the phase AKS1 is preceded by a fault phase FE, wherein a freewheeling phase F is provided between the fault phase FE and the phase AKS1. In other embodiments, only the state AKS1 and not the fault phase FE is included in the preliminary phase VP. The freewheeling phase F, which precedes the phase AKS, may also be included in the preliminary phase VP together with the phase AKS1.

In the intermediate phase T, it can furthermore be seen that the currents decrease due to the changing over between AKS and F, see reference sign E, wherein in the range C the effects on one of the phase currents is illustrated if AKS and F are set alternately: There, the current is constant except for a ripple, wherein this effect also results when hysteresis-based switching over between AKS and F is made and the lower limit on a current limit is illustrated.

The invention claimed is:

1. A method for actuating a vehicle drive having an electric machine and an inverter which is connected to the electric machine for actuation purposes, wherein, if a fault occurs in the electric drive or in a component connected thereto, the inverter generates an AKS state in the form of an active short circuit of phase connections of the electric machine, or the inverter generates a freewheeling state of the electric machine, wherein, once the fault has occurred, the following steps AKS and F are executed alternately in an intermediate phase:

Step AKS: setting the AKS state if a phase current flowing through the phase connections is below a first current limit and changing over to step F if the phase current reaches the first current limit;

Step F: setting the freewheeling state if a DC voltage generated by the electric machine is below a first voltage limit and changing over to step AKS if the DC voltage is above the first voltage limit;

wherein, furthermore, a hysteresis-related changeover is made from step AKS to step F if the phase current falls below a second current limit, which is below the first current limit, and wherein another hysteresis-related changeover is made from step F to step AKS if the DC voltage falls below a second voltage limit, which is below the first voltage limit.

2. The method as claimed in claim 1, wherein in a preliminary phase, which begins at or after the occurrence of the fault and takes place before the intermediate phase, an AKS state or a freewheeling state is set until the intermediate phase is reached.

3. The method as claimed in claim 1, wherein in a subsequent phase, which takes place after the intermediate phase, an AKS state or a freewheeling state is set until the end of the subsequent phase.

4. The method as claimed in claim 1, wherein the intermediate phase is ended if the first current limit is not reached in step AKS.

5. The method as claimed in claim 1, wherein if a fault occurs before the intermediate phase in a preliminary phase, an AKS state is set if a rotational speed of the electric machine is below a rotational speed limit and a freewheeling state is set if the rotational speed of the electric machine is above a rotational speed limit.

6. The method as claimed in claim 5, wherein at the beginning of the preliminary phase it is ascertained whether the rotational speed of the electric machine is above or below the rotational speed limit by measuring a rotational speed by a rotational speed sensor and comparing said rotational speed with the rotational speed limit.

7. The method as claimed in claim 5, wherein at the beginning of the preliminary phase it is ascertained whether the rotational speed of the electric machine is above or below the rotational speed limit by setting a freewheeling state at the beginning of the preliminary phase, during which state the DC voltage is measured and is compared with a voltage threshold value, wherein if the voltage threshold value is exceeded a rotational speed above the rotational speed limit is assumed and if the voltage threshold value is fallen below a rotational speed below the rotational speed limit is assumed.

8. The method as claimed in claim 5, wherein at the beginning of the preliminary phase it is ascertained whether the rotational speed of the electric machine is above or below the rotational speed limit by setting an AKS state at the beginning of the preliminary phase, during which state the phase current is measured and is compared with a current threshold value, wherein if the current threshold value is exceeded a rotational speed above the rotational speed limit is assumed and if the current threshold value is fallen below a rotational speed below the rotational speed limit is assumed.

9. The method as claimed in claim 2, wherein in a subsequent phase, which takes place after the intermediate phase, an AKS state or a freewheeling state is set until the end of the subsequent phase.

10. An electric vehicle drive having an inverter and an electric machine, wherein provision is made for a control apparatus which is connected to the inverter for actuation purposes and is configured to execute the method as claimed in claim 1.

11. A vehicle drive control program which is configured to carry out the method as claimed in claim 1.

* * * * *